(12) United States Patent
Cras

(10) Patent No.: US 9,519,636 B2
(45) Date of Patent: Dec. 13, 2016

(54) DEDUCTION OF ANALYTIC CONTEXT BASED ON TEXT AND SEMANTIC LAYER

(75) Inventor: Jean-Yves Cras, Paris (FR)

(73) Assignee: BUSINESS OBJECTS S.A., Levallois-Perret (FR)

(*) Notice: Subject to any disclaimer, the term of this patent is extended or adjusted under 35 U.S.C. 154(b) by 1529 days.

(21) Appl. No.: 12/326,379

(22) Filed: Dec. 2, 2008

(65) Prior Publication Data

US 2010/0094844 A1    Apr. 15, 2010

Related U.S. Application Data

(60) Provisional application No. 61/105,785, filed on Oct. 15, 2008.

(51) Int. Cl.
*G06F 17/30* (2006.01)
*G06F 17/27* (2006.01)

(52) U.S. Cl.
CPC ....... *G06F 17/2785* (2013.01); *G06F 17/3056* (2013.01)

(58) Field of Classification Search
None
See application file for complete search history.

(56) References Cited

U.S. PATENT DOCUMENTS

| | | | |
|---|---|---|---|
| 5,519,608 A * | 5/1996 | Kupiec | 704/9 |
| 5,555,403 A * | 9/1996 | Cambot et al. | |
| 5,696,962 A * | 12/1997 | Kupiec | 704/9 |
| 5,933,822 A * | 8/1999 | Braden-Harder et al. | |
| 6,026,388 A * | 2/2000 | Liddy et al. | |
| 6,076,051 A * | 6/2000 | Messerly et al. | 704/9 |
| 6,189,002 B1 * | 2/2001 | Roitblat | |
| 6,697,818 B2 * | 2/2004 | Li et al. | |

(Continued)

OTHER PUBLICATIONS

"Non-Final Office Action" mailed Apr. 13, 2011, for U.S. Appl. No. 12/326,348, entitled "Association of Semantic Objects With Linguistic Entity Categories", filed Dec. 2, 2008, 12pgs.

(Continued)

*Primary Examiner* — Christyann Pulliam
*Assistant Examiner* — Mellissa M Ohba
(74) *Attorney, Agent, or Firm* — Buckley, Maschoff & Talwalkar LLC

(57) ABSTRACT

A system includes reception of text, extraction of a plurality of linguistic entities and associated linguistic entity categories based on the text; determination of one or more semantic objects of a semantic layer based on the linguistic entity categories, and generation of a query of the semantic layer based on the plurality of linguistic entities, the associated linguistic entity categories, and the one or more semantic objects. The extraction of the plurality of linguistic entities may include identification of the plurality of linguistic entities from a plurality of semantic object-independent linguistic entity categories and a plurality of semantic object-dependent linguistic entity categories, the plurality of semantic object-dependent linguistic entity categories may be associated with the semantic layer, each of the plurality of semantic object-dependent linguistic entity categories may be associated with a respective semantic object of the semantic layer and each entity of each semantic object-dependent linguistic entity category may be associated with a value of its respective semantic object.

29 Claims, 8 Drawing Sheets

(56) References Cited

U.S. PATENT DOCUMENTS

| | | | |
|---|---|---|---|
| 7,398,201 B2* | 7/2008 | Marchisio et al. | 704/9 |
| 7,761,437 B2 | 7/2010 | Tsuzuki et al. | |
| 7,774,198 B2* | 8/2010 | Roulland et al. | 704/9 |
| 2004/0187140 A1* | 9/2004 | Aigner et al. | 719/328 |
| 2005/0043940 A1* | 2/2005 | Elder | 704/9 |
| 2006/0271353 A1* | 11/2006 | Berkan et al. | 704/9 |
| 2007/0073533 A1* | 3/2007 | Thione et al. | 704/9 |
| 2007/0156393 A1* | 7/2007 | Todhunter et al. | 704/9 |
| 2008/0021924 A1* | 1/2008 | Hall et al. | 707/103 X |
| 2008/0036767 A1 | 2/2008 | Janzen | |
| 2008/0120279 A1* | 5/2008 | Xue | 707/3 |
| 2008/0168135 A1* | 7/2008 | Redlich et al. | 709/204 |
| 2008/0172628 A1* | 7/2008 | Mehrotra et al. | 715/771 |
| 2008/0208820 A1* | 8/2008 | Usey et al. | 707/3 |
| 2008/0275694 A1 | 11/2008 | Varone | |
| 2009/0063426 A1* | 3/2009 | Crouch et al. | 707/3 |
| 2009/0204596 A1 | 8/2009 | Brun et al. | |
| 2010/0094843 A1 | 4/2010 | Cras | |

OTHER PUBLICATIONS

"Final Office Action" mailed Oct. 18, 2011, for U.S. Appl. No. 12/326,348, entitled "Association of Semantic Objects With Linguistic Entity Categories", filed Dec. 2, 2008, 13pgs.

* cited by examiner

DEDUCTION OF ANALYTIC CONTEXT BASED ON TEXT AND SEMANTIC LAYER

CROSS REFERENCE TO RELATED APPLICATIONS

This application claims priority to U.S. Provisional Patent Application Ser. No. 61/105,785, filed Oct. 15, 2008 and entitled "Deduction of an Analysis Context Based on Text", the contents of which are incorporated by reference herein for all purposes.

This application is related to commonly-assigned U.S. patent application Ser. No. 12/326,348, entitled "Association of Semantic Objects with Linguistic Entity Categories" and filed on even date herewith.

BACKGROUND

It has been estimated that 80% of a company's knowledge lies in employee mailboxes and desktops, and not in databases or reports. The former sources can be explored by search engine and text mining technologies, such as Google, Yahoo, or Business Object's Inxight product line. On the other hand, database vendors and Business Intelligence vendors are developing approaches to open their products, traditionally focused on the processing of structured data (e.g., database records or spreadsheet cells), to semi-structured or unstructured data (e.g., pieces of text in documents).

Several approaches have been explored for exploiting potential synergies between structured data and semi-structured (or unstructured) data. In one approach, features are extracted from a piece of text, and the features are stored together with the piece of text in a manner suitable for processing by traditional database or Business Intelligence systems. Many commercial tools, including Business Object's Inxight product line, are able to extract specific features (e.g., sentence, paragraph, clause, entity) from a piece of text and, for instance, build an XML file or a database that associates these features with the originating text. The features may then be used to search the text (i.e., unstructured data) using various front-end tools.

In another approach, indexes, XML documents or databases produced through indexing can be adapted for processing by databases or Business Intelligence software to create reports or analytics. For instance, a system may build an index that relates specific terms (e.g., product names, terms indicating a customer "mood") to their occurrences in a collection of customer support emails. It is then relatively easy to compute aggregates and statistics about the most-commonly used terms, for instance, using database or Business Intelligence software.

Vendors have developed drivers that provide indexing of database or spreadsheet records. However, in general, the relevance of this indexing process is low due to lack of context about the intended semantics of the structured data. For instance, an important piece of customer-related information may be "hidden" in a system table with a name that has nothing to do with customers and won't ever be associated to a search string that involves customers. Business Objects has developed a system that leverages pre-existing knowledge of the business semantics of database data, captured by a "semantic layer", in order to provide indexing of database content and retrieval of the indexed content using unstructured search terms. Such a system requires user-formulated search terms and may not provide results having suitable relevance.

Lastly, one approach (e.g., Microsoft's "English Query") allows users to use natural language in order to express database queries. Such approaches rely on the system's ability to "understand" natural language clauses which, for instance, express complex conditions on data, and also require the creation of a thesaurus that relates database entities to natural language entities. Such approaches are generally not suitable, partly because the ambiguities of natural language queries force the system to systematically re-phrase and double-check its understanding of the query, which is both frustrating and time-consuming for the user, and also because of the cost of setting up the necessary linguistic knowledge in organizations.

Another approach, which has been exemplified by Business Object's Intelligent Question, is to help the user incrementally build a meaningful query in natural language through guided navigation into a user interface to ensure that the question is understood by the system.

Improvements to address one or more shortcomings of the foregoing approaches are desired.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
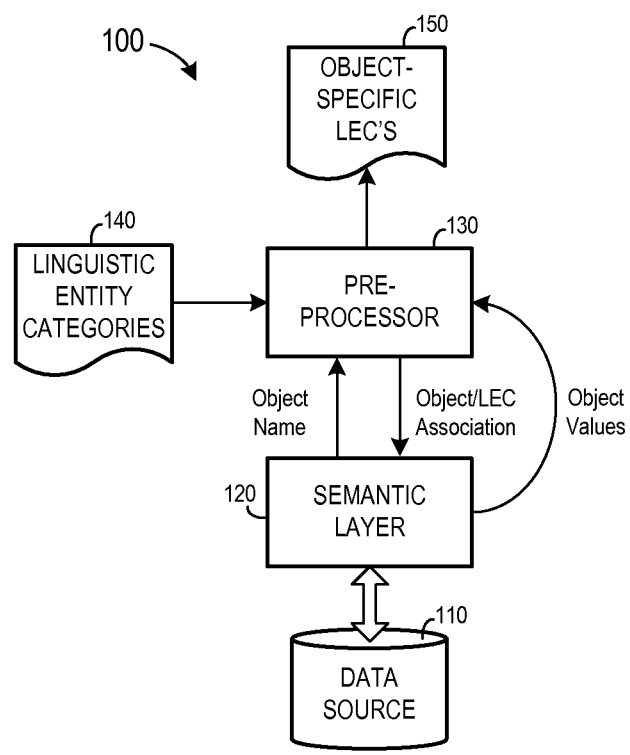
FIG. 1 is a block diagram of a system to pre-process a semantic layer.

FIG. 1 is a block diagram of system 100. System 100 includes data source 110, which may comprise any query-responsive data source or sources that are or become known, including but not limited to a relational database management system and an enterprise application. Data source 110 may store business data of any sort in any form.

Semantic layer 120 may comprise a set of abstract entities known as semantic objects, each of which associates one or more physical entities stored in data source 110 with user-friendly names. Semantic objects of semantic layer 120 may exhibit additional properties (i.e., metadata), such as a data type (e.g., text or numeric), a "qualification" (e.g., dimension, measure, detail . . . ), a "business type" (e.g., financial, time, geography, KPI . . . ), and a structure (e.g., OLAP hierarchies). Types of semantic layers and semantic objects are described in U.S. Pat. No. 5,555,403, and are provided by Business Object's products or other Business Intelligence products. Examples of semantic layers according to some embodiments include Business Objects Universes and OLAP data models.

Pre-processor 130 may comprise any combination of hardware and/or software capable of performing the processes attributed herein to pre-processor 130. Pre-processor 130 may comprise processor-executable program code (e.g., JAVA) providing Web services. During operation, pre-processor 130 uses information from linguistic entity categories 140.

A linguistic entity is a concept denoted by its normal form, a (usually very short) piece of text. The normal form of an entity may have variants, i.e., other pieces of text that are known to denote the same entity. Each entity category of linguistic entity categories 140 is a set of entities of the same kind, grouped as a whole. For instance, an entity may represent the United States. The normal form for this entity may be the string "The United States of America". Variants of the normal form be "U.S.", "The US", "Uncle Sam", "America", etc. Moreover, this entity may belong to a linguistic entity category called "Country", together with other entities of the same kind, such as "France" and "Canada".

Linguistic entity categories are used by some conventional text analysis systems (e.g., Business Objects Thingfinder) to identify entities within a portion of text. Given a piece of text and a set of linguistic entity categories, such systems can reduce the words of the text to a base form (i.e., stemming), identify variants (including the normal form) of any known entity in this text, and return an indication of the found entities with the linguistic entity categories to which they belong. Pre-processor 130 may leverage these functions of a conventional text analysis system as will be described in detail below. However, as will also be described below, linguistic entity categories 140 are different from the linguistic entity categories used by conventional systems.

Object-specific linguistic entity categories 150 include several object-specific linguistic entity categories. Each object-specific linguistic entity category is associated with a single semantic object and includes a plurality of entities. Moreover, each of the plurality of entities corresponds to a value of the semantic object stored in data source 110. For instance, an object-specific linguistic entity category associated with the semantic object "country" may include the entities "France", "Germany", and "US".

Figure 2:
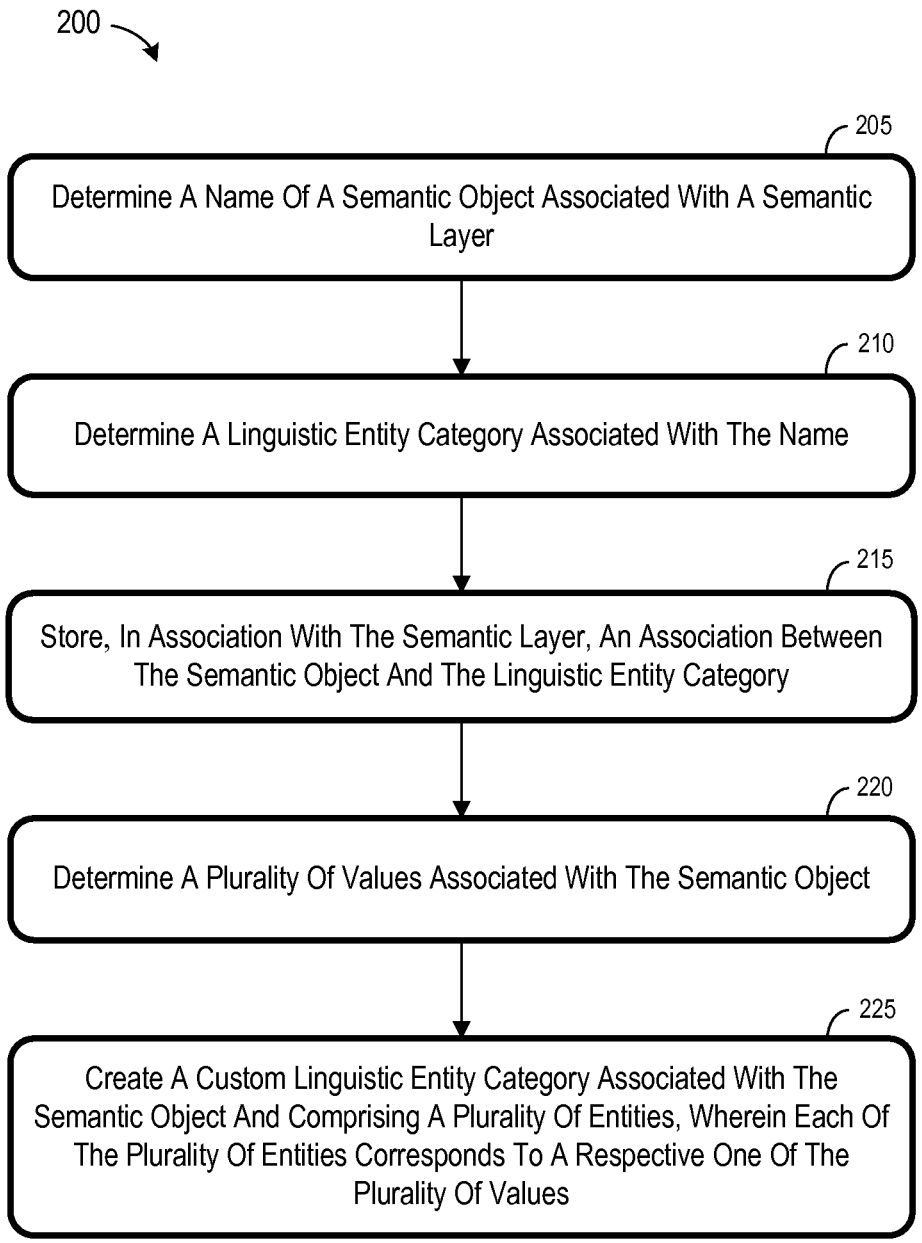
FIG. 2 is a flow diagram of a process to pre-process a semantic layer.

FIG. 2 is a flow diagram of process 200. Process 200, and all other processes described herein, may be executed by hardware and embodied in program code stored on a tangible computer-readable medium. Process 200 may be performed by pre-processor 130 of system 100, but examples are not limited thereto.

Initially at 205, a name of a semantic object associated with a semantic layer is determined. Pre-processor 130 may query semantic layer 120 for the name of one of its objects and receive the object name therefrom as illustrated in FIG. 1. Next, at 210, a linguistic entity category associated with the name is determined.

210 may comprise identifying any of linguistic entity categories 140 which include an entity corresponding to the object name. In some embodiments, the object name is stemmed and the resulting term is compared against the entities (and associated variants) of linguistic entity categories 140. In one example of 210, a semantic object name "customer countries" is stemmed to "country", and the term "country" is identified as a variant of an entity in a "Geography" linguistic entity category.

An association between the semantic object and the determined linguistic entity category is stored in association with the semantic layer at 215. This association is depicted as "Object/LEC Association" in FIG. 1. Continuing the above example, the linguistic entity category "Geography" may be associated with the "customer countries" semantic object and the association may be stored in association with semantic layer 120. The association may be materialized inside semantic layer 120 itself, or in a companion file that remains associated to semantic layer 120.

Next, at 220, a plurality of values associated with the semantic object is determined. Pre-processor 130 may execute this determination by issuing an abstract query containing only the semantic object querying semantic layer 120 or invoking any other means provided by semantic layer 120 to obtain such values. In the case of the "customer countries" semantic object, the determined values may comprise "France", "US" and "Germany".

A custom linguistic entity category associated with the semantic object is created at 225. The custom linguistic entity category includes a plurality of entities, with each entity corresponding to one of the values determined at 220. In some examples, a stem is determined for each of the plurality of determined values and the stems are added as the normal forms of each entity in the custom linguistic entity category. With respect to the above example, the values "France", "Germany", and "US" may be stemmed to themselves, with the results being added as the normal forms of three separate entities in the newly-created "customer countries" custom dimension category.

Process 200 may be repeated, perhaps in batch form, for each other semantic object associated with semantic layer 120. As will be described below, some semantic objects associated with semantic layer 120 may be excluded from processing according to process 200 for various reasons.

Implementations of process 200 may provide logical relationships between semantic objects of a semantic layer and linguistic entity categories. These relationships may be used by current or hereafter-known text processing systems to identify semantic objects that may be related to input text. Such systems may also generate queries of the semantic layer based on the identified semantic objects and their related linguistic entity categories. Accordingly, systems may be utilized to generate structured data queries based on input text.

Figure 3:
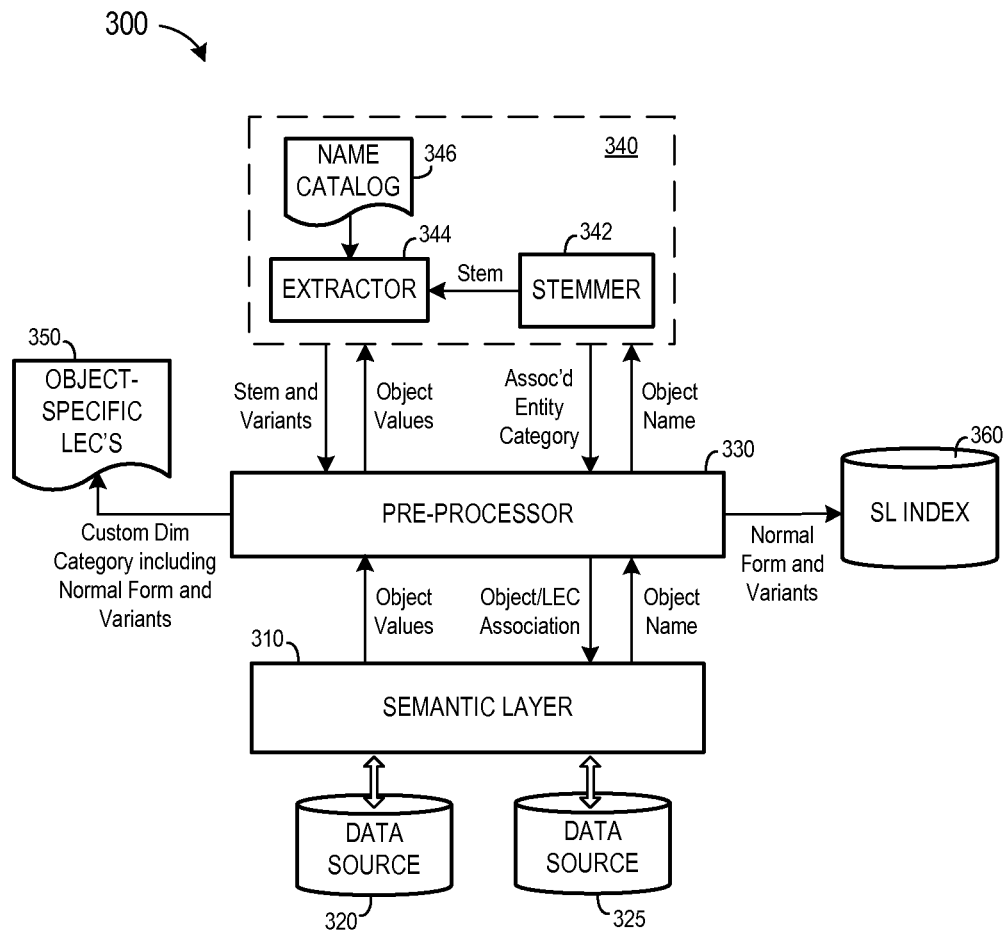
FIG. 3 is a block diagram of a system to pre-process a semantic layer.

FIG. 3 is a block diagram of system 300 according to some embodiments. System 300 may comprise a particular implementation of system 100 of FIG. 1, and may therefore perform process 200 in some examples.

System 300 includes semantic layer 310 in communication with data sources 320 and 325. Data sources 320 and 325 may comprise any suitable data sources that are or become known. As described above with respect to semantic layer 120, semantic layer 310 includes semantic objects which associate one or more physical entities stored in data sources 320 and 325 with user-friendly names. Semantic layer 310 may also convert abstract queries of semantic objects to queries of the associated physical entities of data sources 320 and 325. Semantic layer 310 may provide such abstraction of any number of data sources, and two or more semantic layers may provide different abstractions of a same data source.

Pre-processor 330 may be embodied in executable program code and may perform process 200. As shown, pre-processor 330 receives information from semantic layer 310 and from linguistic processor 340. Linguistic processor 340 may comprise a text analysis system such as, but not limited to, Business Objects Inxight SmartDiscovery Extraction Server.

Stemmer 342 of linguistic processor 340 may receive an object name from pre-processor 330, stem the object name, and provide the stem to extractor 344. Based on the information of name catalog 346, extractor 344 identifies one or more linguistic entity categories which include an entity corresponding to the stem. The identified one or more linguistic entity categories may be returned to pre-processor 330 in association with the object name.

Stemmer 342, extractor 344 and a generic name catalog are known. However, name catalog 346 of system 300 includes previously-unknown linguistic entity categories which hold linguistic entities that can be useful in analyzing structured data. These categories will be generally referred to as Analysis Categories. Four classes of Analysis Categories are described below: Subject Type, Dimension Type, Analysis Type and Dimension.

A Subject Type includes entities used to specify the subject of an analysis. The subject of an analysis is most often some numeric indicator of value, such as financial data, production numbers, etc., the values of which are being analyzed. For instance, an Analysis Category called "Financial performance" and comprising entities such as "Revenue", "Profit" or "Performance" can be sub-classed as a Subject Type category.

A Dimension Type category represents a certain class of possible analysis axes, along which to dispose values of a quantity that is subject to an analysis. The entities in this category may include words that suggest the use of this class of axis. For instance, time is often used as an axis for data analysis; it makes sense to create a Dimension Type including entities related to time. Also included in a "time" Dimension Type category may be entities such as "never", "often", "year", and "period", which suggest that the analysis should be structured around time. In another example, a "geography" Dimension Type category may contain entities that pertain to geography, such as "everywhere", "city", "location", "country", etc.

An Analysis Type category represents the intent of an analysis, and may specify how a subject can be best viewed for that purpose. For instance, an Analysis Type category called "relative comparison" may include entities related to relative comparison of numbers such as "percentage" or "relative contribution".

A Dimension category represents an analysis axis, which itself is an element of a more general Dimension Type category. For instance, there may exist a Dimension category called "country", whose name is itself an element of the "geography" Dimension Type category. Entities in the "country" Dimension category may include individual countries such as France, the US, etc.

An Analysis Category may also fall under one of two other sub-types: Standard Analysis Category or Custom Analysis Category. A Standard Analysis Category (SAC) represents a general concept which may play a role in a large proportion of business areas, databases, and analyses. Because the SACs are intended to support general application, such categories, and their entities, may be provided with a computer program product embodying linguistic processor 340.

Examples of SACs may include: a "time" Dimension Type category, a "geography" Dimension Type category, an "organization" Dimension Type category, a "discrete quantity" Subject Type category, a "financial performance" Subject Type category, a "trending" Analysis Type category, a "relative comparison" Analysis Type category, and a "countries" Dimension category.

It is expected, but not mandatory, that name catalog 346 would provide at least one standard Subject Type category. It is expected, but not mandatory, that most SACs would be Dimension Types, Subject Types, and Analysis Types. Standard Dimension categories could also be provided for some well-known, standardized concepts such as countries, languages, calendars, etc.

Using the format used in some embodiments, the following is a sample of a portion of name catalog 346 showing the sets of entities associated with various SACs:

```
<catalog>
    <entity_category name="Geographic">
        <entity_name canonical="country" />
        <entity_name canonical="city" />
        <entity_name canonical="geography" />
        <entity_name canonical="location" />
        <entity_name canonical="place" />
        <entity_name canonical="everywhere" />
        <entity_name canonical="where" />
    </entity_category>
    <entity_category name="SL_TIME">
        <entity_name canonical="year" />
        <entity_name canonical="quarter" />
        <entity_name canonical="date" />
        <entity_name canonical="period" />
        <entity_name canonical="time" />
        <entity_name canonical="when" />
        <entity_name canonical="never" />
        <entity_name canonical="always" />
        <entity_name canonical="often" />
        <entity_name canonical="rarely" />
        <entity_name canonical="sometimes" />
        <entity_name canonical="evolve" />
        <entity_name canonical="evolution" />
        <entity_name canonical="progress" />
        <entity_name canonical="increase" />
        <entity_name canonical="decrease" />
        <entity_name canonical="improve" />
        <entity_name canonical="trend" />
        <entity_name canonical="decline" />
        <entity_name canonical="grow" />
    </entity_category>
    <entity_category name="SL_SUBJECT_SALES">
        <entity_name canonical="revenue" />
        <entity_name canonical="sale" />
        <entity_name canonical="sell" />
        <entity_name canonical="customer" />
        <entity_name canonical="transaction" />
    </entity_category>
    <entity_category name="SL_SUBJECT_NUMBER">
        <entity_name canonical="number" />
        <entity_name canonical="quantity" />
        <entity_name canonical="count" />
    </entity_category>
    <entity_category name="SL_ANALYSIS_Compare">
        <entity_name canonical="good" />
        <entity_name canonical="better" />
        <entity_name canonical="bad" />
        <entity_name canonical="worse" />
        <entity_name canonical="high" />
        <entity_name canonical="higher" />
        <entity_name canonical="low" />
        <entity_name canonical="lower" />
        <entity_name canonical="absolute" />
        <entity_name canonical="compare" />
        <entity_name canonical="comparison" />
    </entity_category>
    <entity_category name="SL_ANALYSIS_Contribution">
        <entity_name canonical="percentage" />
        <entity_name canonical="proportion" />
        <entity_name canonical="relative" />
        <entity_name canonical="relatively" />
        <entity_name canonical="contribute" />
        <entity_name canonical="contribution" />
    </entity_category>
    <entity_category name="SL_ANALYSIS_Trend">
        <entity_name canonical="evolve" />
        <entity_name canonical="evolution" />
        <entity_name canonical="progress" />
        <entity_name canonical="increase" />
        <entity_name canonical="decrease" />
```

```
    <entity_name canonical="improve" />
    <entity_name canonical="trend" />
    <entity_name canonical="decline" />
    <entity_name canonical="grow" />
</entity_category>
<entity_category name="Country">
    <entity_name canonical="The United States of America">
        <variant name = "U.S" />
        <variant name = "United States" />
    </entity>
    <entity_name canonical="France" />
    <entity_name canonical="Canada" />
    <entity_name canonical="Germany" />
</entity_category>
```

Custom Analysis Categories are more specific linguistic entity categories that are associated with some embodiments. These categories can be of any type, although, in some embodiments, most of them will be Dimension categories. Specifically, some embodiments may automatically create Custom Dimension categories based on existing Semantic Layers and SACs.

System 300 includes object-specific linguistic entity categories 350, which are custom Dimension categories as described above. Categories 350 are created by pre-processor 330 based on semantic objects of semantic layer 310 and the values of those objects as stored in data sources 320 and 325. More specifically, a category of object-specific linguistic entity categories 350 is associated with a single semantic object, and each entity in the category corresponds to one value of the single semantic object. In some embodiments, the normal form of each entity is the stem of its corresponding semantic object value. Pre-processor 330 may also create index entries within semantic layer index 360 to associate semantic layer 310 with the entities (and variants thereof) of object-specific linguistic entity categories 350. As will be described below, such indexing may be useful during subsequent text analysis.

Figure 4:
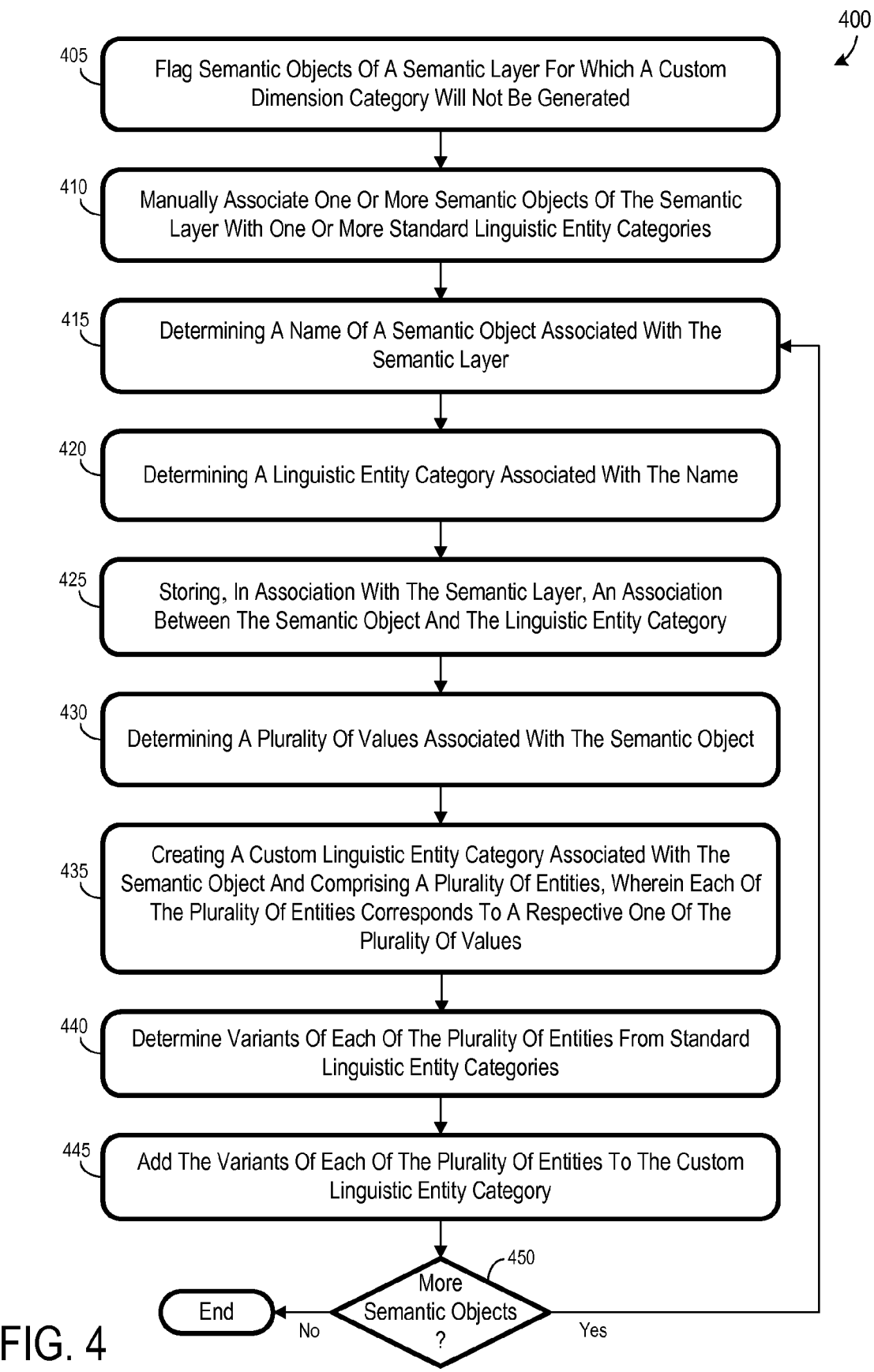
FIG. 4 is a flow diagram of a process to pre-process a semantic layer.

FIG. 4 is a flow diagram of process 400. Process 400 may implement process 200 and/or may be performed by pre-processor 330 of system 300, but implementations are not limited thereto.

Process 400 may run in "batch" mode upon instruction of IT personnel, for example, or as a scheduled task. Process 400 is executed with respect to a specific semantic layer. If more than one semantic layer is available, one semantic layer is chosen for processing prior to process 400.

The selected semantic layer may include long binary or text semantic objects, or semantic objects that have little discriminating power such as addresses. Accordingly, at 405, semantic objects for which a custom dimension category will not be generated are flagged as such. The flagged semantic objects may include semantic objects whose processing would entail significant processing cost.

The flagging at 405 may be automated in part. For example, all semantic objects qualified as a "measure" or "detail" may be flagged, as well as all semantic objects that map to long binary or text database entities. In some examples, a user may be allowed to change these automated flags using a user interface provided by pre-processor 330.

Next, at 410, one or more semantic objects of the semantic layer are manually associated with one or more standard linguistic entity categories. The "standard" linguistic entity categories may comprise Standard Analysis Categories stored in name catalog 346 as described above. A user, for example, may manually associate a semantic layer object called "geological era" to the "time" Dimension Type. Pre-processor 330 may also provide a user interface to facilitate the manual association at 410.

The SACs of name catalog 346 may be customized prior to process 400 based on user needs. For example, a company may employ a very specific vocabulary to designate time periods, geographical locations, organizations, KPIs, etc., and may customize the definition of SACs in name catalog 346 accordingly. One or more semantic objects may be manually associated with such customized SACs at 410.

The SACs (including any customized SACs) are loaded into linguistic processor 340 at some point prior to process 400. The SACs are loaded into name catalog 346 according to the present embodiment, but embodiments are not limited thereto.

At 415, a name of a semantic object associated with a semantic layer is determined. The semantic object may comprise a semantic object of semantic layer 310 that was not flagged at 405. Pre-processor 330 may query semantic layer 310 for the name and receive the object name therefrom as illustrated in FIG. 3. A linguistic entity category associated with the name is then determined at 420.

According to some examples of 420, the object name is passed to linguistic processor 340. The object name may be inserted in a sentence in a noun phrase role, such as "the XXX is a semantic layer object", where XXX is the object's name. Next, stemmer 342 stems all words in the sentence, and extractor 344 compares the stemmed values with the entities and variants of Analysis Categories within name catalog 346. For example, if the object name is "customer countries", linguistic processor 340 will determine that "country", the stemmed version of "countries", is a variant of an entity in the "Geography" Analysis Type category.

Imposing the object's name to be used as a noun phrase may help to disambiguate the stemming process. For instance, "left" could be stemmed either to itself (as a noun) or to "leave" (as a verb), depending on its grammatical usage. Using the noun phrase approach, a semantic object called "left" would be stemmed as itself.

An association between the semantic object and the determined linguistic entity category is stored in association with the semantic layer at 425. Continuing the above example, the linguistic entity (i.e., Dimension Type) category "Geography" may be associated with the "customer countries" semantic object and the association may be stored in association with semantic layer 310. The association may be materialized inside semantic layer 310 if it offers a write API or any ability to augment it programmatically. The association may also or alternatively be stored in a companion file that remains associated to semantic layer 310.

Next, a plurality of values associated with the semantic object is determined at 430. The values are determined in order to create a custom linguistic entity category associated with the semantic object. It may be desirable to avoid creating a custom category for some semantic objects. For example, semantic objects marked as "measure" may be excluded from this and subsequent steps of process 400.

In some implementations, pre-processor 330 queries semantic layer 310 to produce a complete list of values. The query may comprise an abstract query containing only the candidate semantic object. Of course, semantic layer 310 may offer other means of acquiring lists of values, lists of dimension members or similar "data outline" capabilities.

Next at 435, a custom linguistic entity category associated with the semantic object is created. The custom linguistic entity category includes a plurality of entities, and each of the entities corresponds to a respective one of the plurality of values. For example, stemmer 342 may receive the object values from pre-processor 330 and stem the values. Each stem is then added as the normal form of an entity in the new custom category associated with the semantic object.

Variants of each entity of the custom linguistic entity category are determined from the standard linguistic entity categories (e.g., SACs) at 440, and added to the custom linguistic entity category at 445. More specifically, extractor 344 may compare the stemmed values of the semantic object with entities and variants of standard linguistic entity categories of name catalog 346. If a stemmed value is recognized as an entity or an entity variant of a standard Dimension category, then the normal form and all other variants of this entity are added as variants of the entity which corresponds to the stemmed value in the newly-created custom linguistic entity category.

For example, a standard Dimension category called "countries" may contain an entity "The United States of America", of which "US" and "America" are variants. Therefore, the variants "The United States of America" and "America" are added to the "US" entity of the new "customer countries" custom dimension category.

Flow may proceed to 450 and return to 415 for processing of a next semantic object. Process 400 terminates once all semantic objects to be processed have been processed. Each step of process 400 may be performed simultaneously for many or all semantic objects of semantic layer 310. For example, names of many semantic objects are determined at 415, linguistic entity categories associated with each name are determined at 420, etc.

Pre-processor 330 may pass all normal forms and variants of object-specific linguistic entity categories 350 to semantic layer index 360. Index entries are then created which associate the normal forms and variants with semantic layer 310. Accordingly, if search terms which include any of the normal forms and variants are applied against index 360, the returned search results would include an indication of semantic layer 310.

Figure 5:
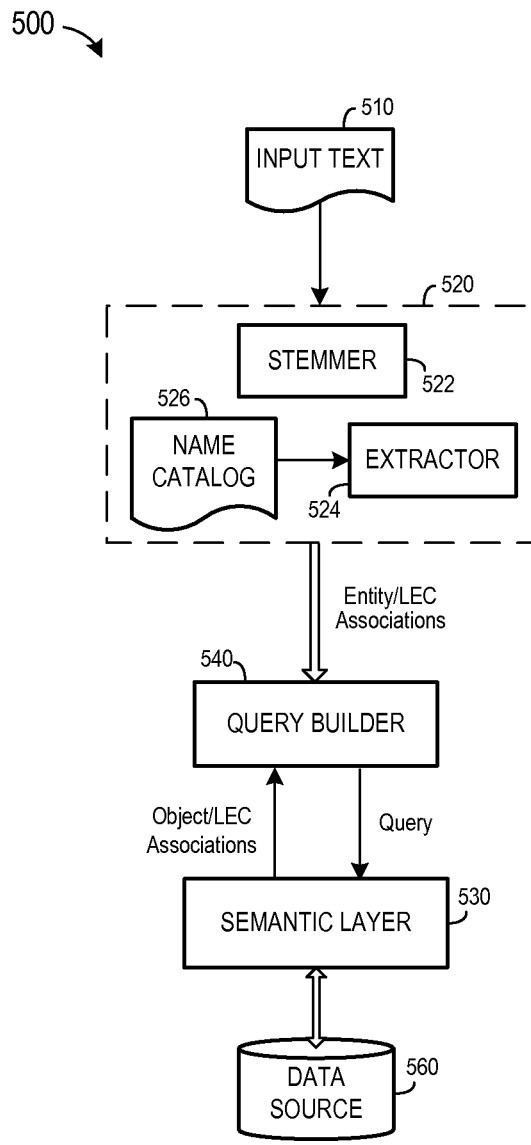
FIG. 5 is a block diagram of a system according to some embodiments.

FIG. 5 is a general block diagram of system 500 according to some embodiments. System 500 may be used in conjunction with the information generated by processes 200 and/or 400. Input text 510 may comprise any amount of text from any source, including but not limited to an electronic mail message, a text document and a presentation. Accordingly, input text 510 may comprise so-called unstructured data, but embodiments are not limited thereto.

Linguistic processor 520 receives input text 510 and processes input text 510 according to systems that are or become known. For example, stemmer 522 may stem words and phrases of input text 510 and, for each stem, extractor 524 may identify any linguistic entities of name catalog 526 which match the stem. Each identified linguistic entity is associated with a linguistic entity category of name catalog 526. In contrast to known systems, name catalog 526 is enriched with standard linguistic entity categories (SACs) such as those described above. Moreover, name catalog 526 includes object-specific linguistic entity categories (e.g., custom Dimension categories) associated with semantic objects of semantic layer 530.

Query builder 540 receives the identified entities and associated entity categories from linguistic processor 520. Query builder 540 also receives the previously-generated (e.g., by process 200 or process 400) information associating semantic objects of semantic layer 530 to one or more linguistic entity categories. Query builder 540 builds a query based on the identified linguistic entities, their associated linguistic entity categories, and on semantic objects of layer 530 which are also associated with the linguistic entity categories. Detailed examples of building a query are described below. Semantic layer 530 may receive the query and automatically generate corresponding physical queries to retrieve desired data from data source 560.

Figure 6:
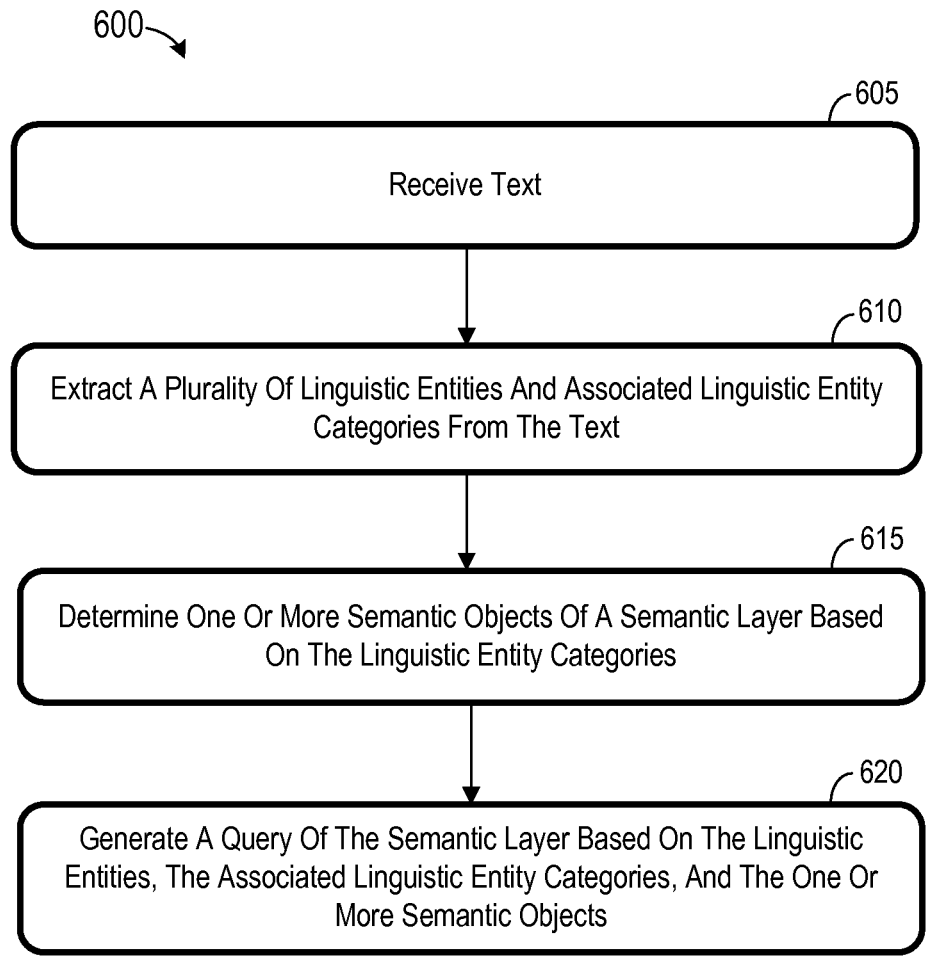
FIG. 6 is a flow diagram of a process according to some embodiments.

FIG. 6 illustrates process 600 according to some embodiments. Process 600 may be performed by system 500 but embodiments are not limited thereto.

Text is received at 605 by a text analysis system such as linguistic processor 520. The received text may comprise any text based on which a structured query is desired. For example, prior to 605, a user may select an electronic mail message and a "Query backend" function in order to retrieve structured data related to the electronic mail message. The electronic mail message is then received by linguistic processor 520 at 605.

Next, at 610, a plurality of linguistic entities and linguistic entity categories are extracted from the text. As described above, linguistic processor 520 may extract the linguistic entities by stemming word(s) of the text and identifying entities of name catalog 526 which correspond to the stemmed values. Also extracted are the linguistic entity categories of name catalog 526 which are associated with each extracted linguistic entity.

One or more semantic objects of a semantic layer are determined at 615 based on the extracted linguistic entity categories. For example, query builder 540 may receive the above-described information which associates semantic objects of semantic layer 530 with one or more linguistic entity categories. Query builder 540 uses the information to determine the semantic objects which are associated with each of the extracted linguistic entity categories.

A query of the semantic layer is then generated at 620. The query is generated based on the extracted linguistic entities, their associated linguistic entity categories, and the determined semantic objects of the semantic layer (i.e., which are also associated with the linguistic entity categories). Semantic layer 530 may receive the query and automatically generate corresponding physical queries to retrieve desired data from data source 560.

System 500 and process 600 may therefore leverage previously-determined relationships between semantic objects of a semantic layer and linguistic entity categories to generate meaningful queries of structured data based on input text. The foregoing description of FIG. 7 and FIG. 8 sets forth additional details of possible embodiments for leveraging this information.

Figure 7:
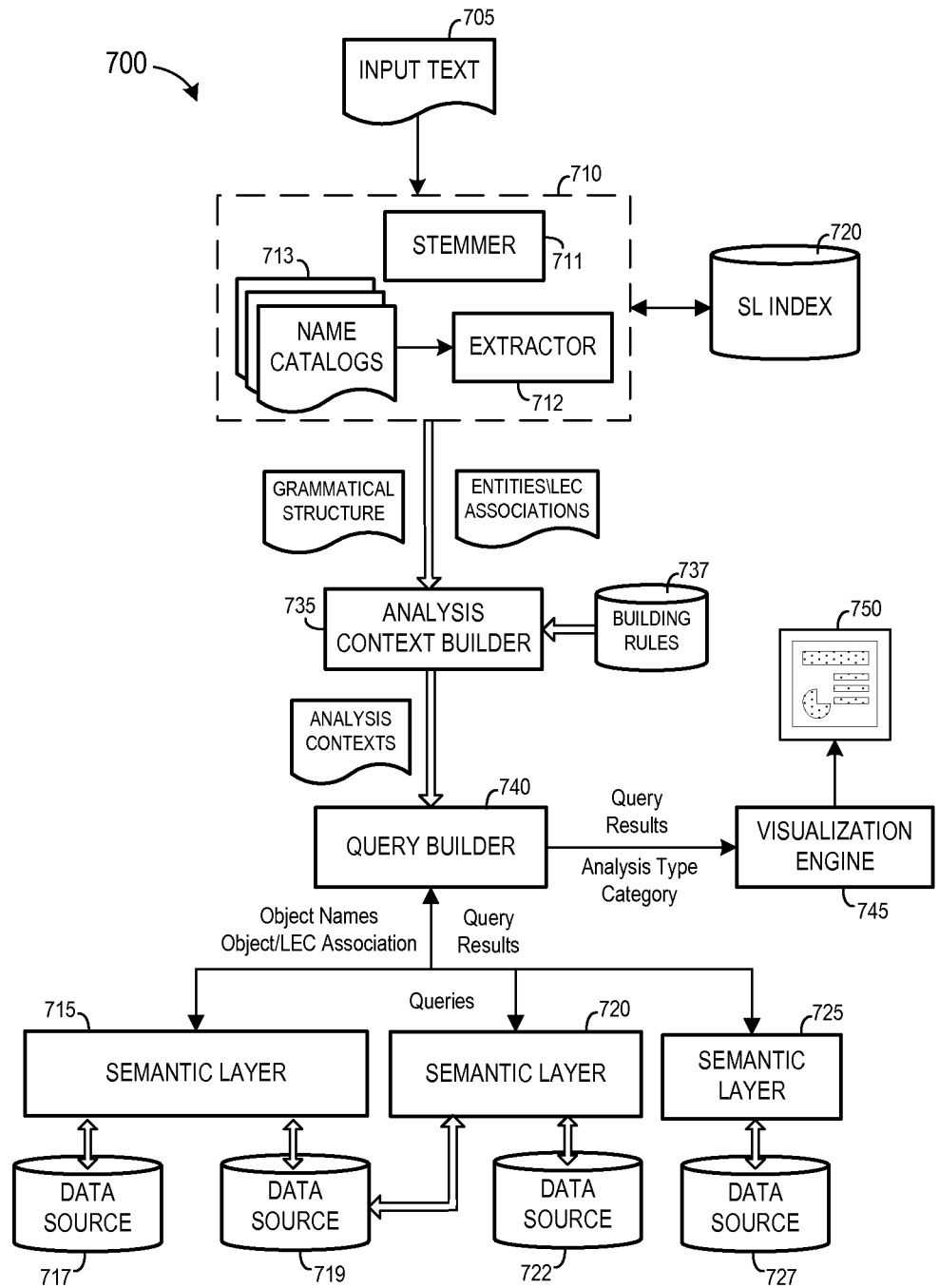
FIG. 7 is a block diagram of a system according to some embodiments.

System 700 of FIG. 7 may embody the functions described above with respect to system 500 and process 600. The individual elements of system 700 will be discussed below, and a detailed example of processing using system 700 is set forth below with respect to FIG. 8.

Input text 705 may be received from any data storage or from a user via a graphical user interface. As mentioned above, input text 705 may comprise an electronic mail message, a text document or a presentation. In some applications, input text 705 comprises unstructured data which is not formatted as a query.

Stemmer 711 of linguistic processor 710 stems input text 705 and extractor 712 identifies any corresponding linguistic entities of a name catalog 713. Linguistic processor 710 outputs the identified entities and their linguistic entity. Each of name catalogs 713 is enriched with standard linguistic entity categories (SACs) such as those described above, and includes object-specific linguistic entity categories (e.g., custom Dimension categories) associated with semantic objects of a particular one of semantic layers 715, 720 and 725.

The particular name catalog 713 used during the aforementioned extraction may be selected by searching semantic layer index 730 for the stemmed values of input text 705. In this regard, semantic layer index 730 includes index entries which associate each of semantic layers 715, 720 and 725 with normal forms and variants of their constituent semantic objects.

Linguistic processor 710 also determines and outputs data indicating the grammatical structure (e.g., paragraphs, sentences, clauses) of input text 705. As will be described below, analysis context builder 735 uses building rules 737, the grammatical structure, and the entity/category associations to build one or more Analysis Contexts. Query builder 740 builds a query based on the Analysis Contexts and on previously-generated information associating semantic layer objects with linguistic entity categories. The query is forwarded to the selected semantic layer, which, in turn, generates corresponding physical queries to retrieve desired data from one or more associated data sources.

Query builder 740 passes the query results to visualization engine 745. Query builder 740 may also pass an Analysis Type category which was used to build the query. Visualization engine 745 may select a particular visualization (e.g., a pie chart, a bar chart, etc.) based on the Analysis Type category and the query results, and build visualization 750 to illustrate the query results.

Figure 8:
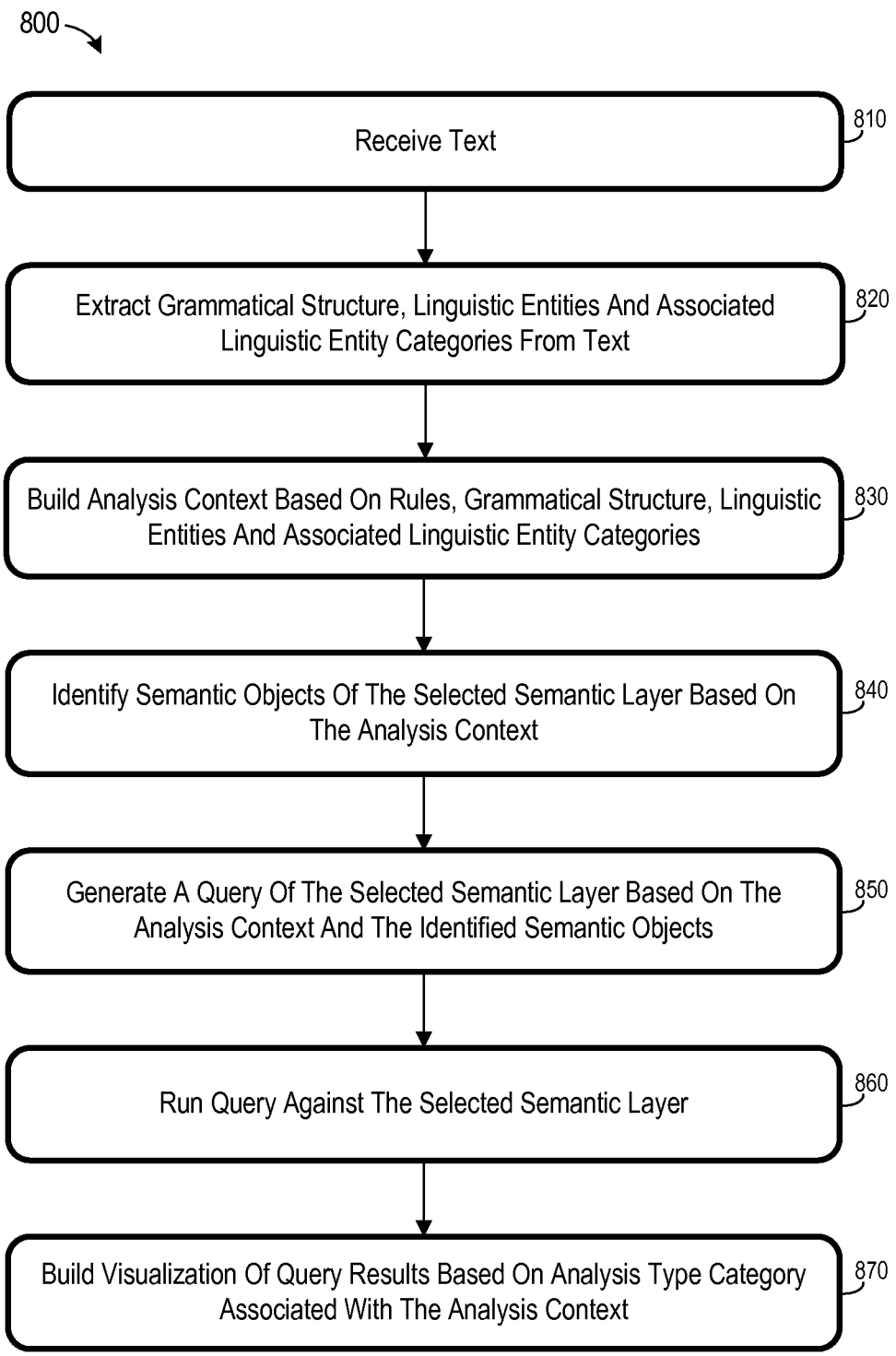
FIG. 8 is a flow diagram of a process according to some embodiments.

FIG. 8 illustrates process 800 usable in conjunction with some embodiments. Process 800 may be performed by systems 500 or 700, but embodiments are not limited thereto.

Prior to process 800, linguistic processor 710 is loaded with one or more SACs and object-specific linguistic entity categories (e.g., custom Dimension categories) as described above. This loading may comprise compiling name catalogs 713 based on the SACs, the object-specific linguistic entity categories, and any conventional entity categories provided by linguistic processor 710.

For example, each name catalog 713 may be augmented with all available SACs that are Subject Type, Dimension Type, and Analysis Type categories. Standard Dimension categories may be omitted. Each of name catalogs 713 may be associated with one of semantic layers 715, 720 and 725. Each of name catalogs 713 may therefore also be augmented with all custom Dimension categories representing semantic objects of its associated semantic layer. Accordingly, a standard "countries" Dimension category may have been used during pre-processing (e.g., during process 200 or process 400) but will not be used to augment linguistic processor 710. However, a custom "country" Dimension category created based on a "country" semantic object will be used to augment a name catalog associated with a semantic layer including the "country" semantic object.

Turning to process 800, text is received at 810 by a text analysis system configured as described above. Next, at 820, linguistic processing is applied to the input text to extract a grammatical structure as a hierarchy of paragraphs, sentences, and clauses. A specific example of 820 will be described with respect to the following input text: "Our performance in Consumer Electronics is good. The contribution of our direct sales force is still improving everywhere this quarter. Revenue in America is particularly good." According to the example, linguistic processor 710 determines that the bolded sentence is the second sentence in a paragraph of three sentences, and that it includes only one clause.

A particular one of name catalogs 713 may be selected at 820. In one example, a query of semantic layer index 730 may be assembled from stemmed values of the received text. Since semantic layer index 730 includes index entries which associate each of semantic layers 715, 720 and 725 with normal forms and variants of their constituent semantic objects, the search results may indicate which of semantic layers 715, 720 and 725 is most relevant to the received text.

A plurality of linguistic entities and linguistic entity categories of a corresponding one of name catalogs 713 is also extracted from the text at 820. Linguistic processor 710 may extract the linguistic entities by stemming word(s) of the text and identifying entities of the name catalog 713 which correspond to the stemmed values. Using the above example, "contribution" is an entity of the "comparison" Analysis Type category, "direct" is an entity in a custom "channel" Dimension, "still" and "improve" (i.e., the stem of improving) are both entities from the "time" Dimension Type category, "everywhere" is an entity from the "geography" Dimension Type category, and "quarter" is the name of a custom Dimension, and is also an entity in the "time" Dimension Type category.

The extracted grammatical structure, linguistic entities, and categories associated with each linguistic entity are received by analysis context builder 735 at 830. Analysis context builder proceeds to build an Analysis Context at 830 based on the received information and on building rules 737.

An Analysis Context is a sub-set of the available set of Analysis Categories. Each of the Analysis Categories in the Analysis Context is associated with a (possibly empty) subset of its entities. According to some examples, an Analysis Context must contain exactly one Subject Type category. It is possible to compute a default Subject Type for an Analysis Context, as described below. Also, an Analysis Context must contain at most one Analysis Type category.

The following example shows a possible representation of a valid Analysis Context. The name of each Analysis Category is followed by a subset of its set of entities.

Sales: { }; Time {"still", "improve", "Quarter"}; Geography {"everywhere"}; Channel: {"Direct"}; Quarter: { }; Comparison: {"Contribution"}

In this example, Sales is a Subject Type category; Time and Geography are Dimension Type categories; Channel and Quarter are Dimension categories; and Comparison is an Analysis Type category. As explained below, this Analysis Context could automatically be deduced from the clause in bold taken from the following piece of text:

"Our performance is good. The contribution of our direct sales force is still improving everywhere this quarter."

Analysis context builder 735 may incrementally create a collection of Analysis Contexts at 830. The first Analysis Context is built by retaining all the standard or custom Analysis Categories that have been identified in the first clause of the first sentence, along with their entities. Continuing with the above example, the following Analysis Context may be obtained from the first sentence:

Financials: {"performance"}; Comparison: {"good"}; Product: {"Consumer Electronics"}

"Performance" has been recognized as an entity from the "financials" Subject Type category; "good" as an entity from the "comparison" Analysis Type category, and "consumer electronics" as an entity from the "product" custom Dimension category, which was generated during a semantic layer pre-processing.

The second clause (here a whole sentence) is then processed. First, as above, all Analysis Type categories are retained and their entities are identified. This gives us the Analysis Context:

Comparison: {"contribution"}; Channel: {"direct"}; Time: {"still", "improve", "quarter"}; Geography: {"everywhere"}; Quarter: { }

This Analysis Context is incomplete, because it does not contain a Subject Type category.

In order to remove ambiguities or implicit references at this level, building rules 737 include the following two rules: 1) If a Subject Type category has been identified in a previous clause and has not been explicitly re-stated, the Subject Type category is propagated to the current Context; and 2) If a Dimension category with associated entities has been recognized in a previous Analysis Context of the same sentence, the Dimension category gets propagated to the current Context, unless the same Dimension category is mentioned again or the Dimension Type of this Dimension category gets mentioned.

Based on the first rule, the "financials" Subject Type category is added to the second Analysis Context, even though an entity of the category does not explicitly appear in the second clause. The second rule does not apply to the current example, but would apply to the following example:

"Our performance in Consumer Electronics is good, and the contribution of our direct sales force is still improving everywhere this quarter. Revenue in America is particularly good."

In this case, because no entities of a "product" custom Dimension category are mentioned in the second clause (in bold) of the first sentence, the restriction stated in the first clause of this sentence should be retained. However, if the second sentence contained a statement such as "for all products", this would not be the case.

Returning to the previous example, the restriction on products is not propagated to the second sentence, and the final Analysis Context associated to second sentence is:

Comparison: {"contribution"}; Channel: {"direct"}; Time: {"still", "improve", "quarter"}; Geography: {"everywhere"}; Quarter: { }; Financials: {"performance"}.

Likewise, the third sentence will yield

Financials: {"performance"}; Country: {"US"}; Comparison: {"good"}

The two rules above do not exhibit the same scope of application. That is, subjects are propagated across sentence and paragraph boundaries, while dimensional entities are not. So if our sample text consisted of "Our performance in Consumer Electronics is good.

The contribution of our direct sales force is still improving everywhere this quarter. US revenue is particularly good.", the context of the sentence in bold would hold no reference to Consumer Electronics, but would hold a reference to the "financials" Subject Type category.

It is desired that an Analysis Context include only one Analysis Type category. If two different Analysis Type categories appear in a Context, the category having the most associated entities is retained. In case the numbers of associated entities are equal (or in case no Analysis Type categories appear in a Context, the "comparison" Analysis Type category is added to the Analysis Context.

One or more semantic objects of a semantic layer are determined at 840 based on the Analysis Context. If more than one Analysis Context is built at 830, one or more semantic objects are determined for each of the Analysis Contexts.

As an initial step, those categories of the Analysis Context which should be represented by a semantic object are identified. Analysis Type categories are ignored, and only Subject Type, Dimension Type and Dimension categories are considered. Second, if the name of a semantic object is explicitly mentioned in the input text, the name will appear as an entity attached to some category in the Analysis Context. In this case, this semantic object is necessarily made part of the query, and its corresponding category is removed from the Analysis Context. For instance, if a "Revenue" semantic object exists and the text includes the sentence "Revenue is high", the "Revenue" semantic object will be identified at 840.

Likewise, if a custom Dimension category built from a semantic object appears without ambiguity in the Context, then this semantic object is made part of the query, its corresponding linguistic entities are remembered (they will be used as query filters), and the custom Dimension category is removed from the Context. For instance, the sentence "Performance is good in the US" identifies without ambiguity the entity "US" from the custom Dimension category "country". Accordingly, the semantic layer object "country", filtered on the value "US", will be added to the query.

There may be cases when a single value could be part of two different custom Dimension categories. The name "Washington", for example, could appear both as a customer name and a state name. This ambiguity may be resolved at a later stage as described below.

The foregoing processing results in a set of Dimension Type categories and one Subject Type category, to each of which at least one semantic layer object should be associated.

The following example of 840 uses the following context: Comparison: {"contribution"}; Channel: {"direct"}; Time: {"still", "improve", "quarter"}; Geography: {"everywhere"}; Quarter: { }; Financials: {"performance"}.

As mentioned above, the Analysis Type category is ignored, resulting in:

Channel: {"direct"}; Time: {"still", "improve", "quarter"}; Geography: {"everywhere"}; Quarter: { }; Financials: {"performance"}.

The "time" Dimension Type category contains the "quarter" entity, which also is a semantic layer object. Therefore, the "time" category is removed (the "quarter" semantic object is identified for adding to the query in a subsequent step), yielding:

Channel: {"direct"}; Geography: {"everywhere"}; Quarter: { }; Financials: {"performance"}.

Last, we also remove the "channel" and "quarter" Dimension categories, and flag the corresponding semantic objects for addition to the query (the "quarter" object has already been flagged). The following categories and associated entities remain:

Geography: {"everywhere"}; Financials: {"performance"}.

Next, a set of semantic layer objects that match each of the remaining categories is identified. Also, one such set is selected in a way that will provide for a consistent, meaningful query.

This identification utilizes the associations between semantic objects and standard Analysis Categories which were identified and stored during a pre-processing phase such as described with respect to FIGS. 1 through 4. With respect to the current Analysis Context, it may have been determined that the "country" and "state" semantic objects are associated to the "geography" Dimension Type category, and that semantic objects "revenue" and "profit" are associated to the "financials" Subject Type category. These associated objects are also flagged for addition to the query.

In the present example, the following semantic objects are now flagged: Quarter (filtered on value "direct"); Channel;

{City, State}; and {Revenue, Profit}. The underlined semantic objects may be considered fixed, while the remaining objects are candidates. At least one of each candidate in each set should be in the final query. If this condition cannot be met, no query will get generated for this Analysis Context.

Several options are possible, which may depend on the capabilities offered by the semantic layer. The semantic layer may provide means of knowing which objects can meaningfully be associated in an abstract query that will return a single row-set, and which cannot. For instance, it may happen that a "revenue" object is functionally independent from another object called "warehouse" (e.g., because sales revenue does not depend on which warehouse a product comes from). In such a case, associating these two objects in a single abstract query would result into two separate row-sets: the (fully aggregated) revenue on one hand, and the list of warehouses on the other hand. Such objects are said to be incompatible.

If the objects of the current set are compatible, then the query is complete. This might well be the case in the above example, where Revenue and Profit are two measures dimensioned on City, Quarter and Channel, and where City and State form a natural hierarchy.

If the objects are incompatible, all possibilities offered by the various combinations of candidate objects are explored. If at least one such combination is compatible, the query may be generated therefrom. In some implementations, only maximal sets (for the inclusion relationship) are used to generate queries. If, by adding an element to a compatible set of semantic objects, we obtain another compatible set, then the latter is used and not the former.

Some scenarios may produce several, incomparable sets of semantic objects. For example, a company may manage inventories in warehouses and sell products in shops. In this context, the sentence "our numbers are high everywhere" might represent high inventories in all warehouses, or high revenue for all shops. In such a scenario, it may be decided to produce one query per valid combination, or to have a user choose a combination which makes most sense to them, or to not build any query.

If the semantic layer offers additional capabilities, such as exposing a network of functional dependencies for its objects, then the algorithm above can be further refined. For instance, if several candidate objects are provided for a Dimension Type category, and if one of these candidates is functionally dependent on the others, then it may be determined to adopt only this one candidate. In our previous example, knowing that City and State form a hierarchy, hence that a State is uniquely determined by a City, one can decide to keep only "State" in the query, thus minimizing the size of data to display, and also knowing that the user will be further allowed to interact with the data and drill down to the level of cities if they want to.

A query is generated based on the identified semantic objects at 850. Generation of the query includes a determination of whether and how the identified set of semantic objects is to be filtered. Entities of a custom Dimension category which are explicitly mentioned in the text may be used to filter the query. In our example, the value "direct" from the custom Dimension category "channel" matches a value for the "channel" semantic layer object and the value will therefore be used as a query filter.

If the Analysis Type category for the current context is "relative contribution", a predefined category, then a semantic object explicitly mentioned in the same clause won't be filtered. Rather, data for its other values will be retrieved, possibly as a group, so as to enable relative comparison. This situation may occur in response to a sentence such as "The relative contribution of the US to our revenue is high."

With additional linguistic processing, it may be possible to determine in a more accurate way which Dimension category, if several are mentioned in the same clause, is subject to the comparison. In this case, only this Dimension category would see its values unfiltered. For instance, based on the sentence "The relative contribution of the US to our Customer Electronics revenue is high", the Product dimension should be filtered on Customer Electronics, but the Country dimension should not be filtered. Short of this more advanced linguistic capability, however, default behavior may dictate that both the Country and Product dimensions are unfiltered.

If a single entity is mentioned for a Dimension category, then this Dimension category may be removed from the query result and only kept in the filter. Such an operation may allow for simpler charts, as a dimension axis consisting of one value would not be particularly useful.

Once the query has been entirely determined, it is run against the selected semantic layer to retrieve a row-set. More particularly, the semantic layer may receive the query and automatically generate corresponding physical queries to retrieve desired data from a corresponding data source.

At 870, the query results and the name of the (unique) Analysis Type category associated with each Analysis Context are passed to visualization engine 745. The name is used as a parameter for a rule-based determination of which chart is most suited to present query results. Examples of such a rule-based determination are set forth in commonly-assigned, co-pending U.S. patent application Ser. No. 11/503,486, entitled Apparatus and Method for Visualizations of Multidimensional Data, the contents of which are hereby incorporated by reference for all purposes.

The rules may describe, for each SAC of type "Analysis Type" (if any), how a chart should be chosen, depending on its data topology. A set of such rules is associated with each SAC that represents a type of analysis. As an example, the "trending" Analysis Type category might be associated with one rule set, and the "relative comparison" Analysis Type category with another.

In some implementations of process 800, a track may be created which relates each visualization back to the words in the initial text that were used to build it. For each Analysis Type category that appears in an Analysis Context, the position of the entities found in the text for this category are noted. If a category is propagated from one Analysis Context to the next, so are the positions of its entities. Therefore, any given Analysis Context can be related to words in the current clause, or in previous clauses, sentences or paragraphs. A visualization may then be traced back to the semantic layer query that was used to build it, to the source Analysis Context, and then back to its original words. If a user selects a given visualization, the corresponding original words in the text may be highlighted.

In the above description, dimensional contexts (i.e., Dimension categories and their relevant entities) may be propagated to other contexts in the same sentence. This process may be improved with better resolution of anaphors, i.e., by using a linguistic processing capability to resolve references such as "it", "the latter", "there", etc. If such capability is provided, a dimensional context can be propagated only if its Dimension category is referred to in another clause through such a grammatical reference.

For example, given the text "Numbers in the US are good, and Consumer Electronics is doing very well there", the Country dimension would be propagated from the context of the first clause to the context of the second clause. However, for the text "Numbers in the US are good, and Consumer Electronics is doing very well too", the geography Dimension type may be removed from the second clause's context, which may result in a more useful query.

Embodiments described herein are solely for the purpose of illustration. Those in the art will recognize other embodiments may be practiced with modifications and alterations to that described above.

What is claimed is:

1. A method comprising:
   receiving text in a system that includes a processor;
   extracting, by the system, a plurality of linguistic entities and associated linguistic entity categories based on the text;
   determining, by the system, one or more semantic objects of a semantic layer based on the linguistic entity categories, wherein each of the one or more semantic objects of the semantic layer associates one or more physical entities stored in a data source with user-friendly names;
   determining, by the system, an analysis context based on the text, the linguistic entities, and the associated linguistic entity categories;
   after determination of the analysis context and the one or more semantic objects by the system, generating, by the system, a query of the semantic layer based on the analysis context determined by the system and the one or more semantic objects determined by the system, wherein the generating the query of the semantic layer comprises:
      determining, by the system, based on the linguistic entity categories that were extracted, whether the one or more semantic objects are to be filtered, and in response to determining to filter the one or more semantic objects, determining how to filter the semantic objects,
      wherein when a value from a first linguistic entity category matches a value for one of the one or more semantic objects, using the value from the first linguistic entity category as a query filter, and when only a single entity is mentioned for the first linguistic entity category, including the entity in the query filter and removing the first linguistic entity category from a result of the query of the semantic layer; and
   receiving a structured data result in response to the query of the semantic layer.

2. The method according to claim 1, wherein extracting the plurality of linguistic entities comprises:
   identifying the plurality of linguistic entities from a plurality of semantic object-independent linguistic entity categories and a plurality of semantic object-dependent linguistic entity categories,
   wherein the plurality of semantic object-dependent linguistic entity categories are associated with the semantic layer, and
   wherein each of the plurality of semantic object-dependent linguistic entity categories is associated with a respective semantic object of the semantic layer and each particular entity of each particular semantic object-dependent linguistic entity category is associated with a value of the respective semantic object associated with the particular semantic object-dependent linguistic entity category.

3. The method according to claim 1, further comprising:
   identifying two or more phrases from the text,
   wherein determining an analysis context comprises:
      for each of the two or more phrases, identifying an associated linguistic entity.

4. The method according to claim 3, wherein extracting the associated linguistic entity comprises:
   identifying the associated linguistic entity category from a plurality of semantic object independent linguistic entity categories and a plurality of semantic object-dependent linguistic entity categories,
   wherein the plurality of semantic object-dependent linguistic entity categories are associated with the semantic layer, and
   wherein each of the plurality of semantic object-dependent linguistic entity categories is associated with a respective semantic object of the semantic layer and each particular entity of each particular semantic object-dependent linguistic entity category is associated with a value of the respective semantic object associated with the particular semantic object-dependent linguistic entity category.

5. The method according to claim 1, wherein generating the query of the semantic layer comprises:
   generating a second query based on the analysis context.

6. The method according to claim 1, further comprising:
   receiving query results associated with the query; and
   determining a visualization based on the query results and on one or more of the associated linguistic entity categories.

7. The method according to claim 6, further comprising:
   determining the visualization based on an Analysis Type category associated with the query.

8. The method according to claim 1, wherein the linguistic entity categories include a subject type category, an analysis type category and a dimension type category; and
   wherein the determining an analysis context based on the text, the linguistic entities, and the associated linguistic entity categories comprises:
      determining an analysis context including the subject type category, the analysis type category and the dimension type category, wherein the subject type category included in the analysis context specifies a subject of an analysis, said subject of the analysis being a numerical indicator of value, wherein the analysis type category included in the analysis context is different than the subject type category and represents an intent of the analysis, wherein the dimension type category included in the analysis context is different than both the subject type category and the analysis type category and represents an axis of the analysis, wherein values of a quantity are to be disposed along the axis of the analysis.

9. The method according to claim 1, wherein the linguistic entity categories include a subject type category, an analysis type category and a dimension type category;
   wherein the method further comprises:
      dividing the received text into a plurality of clauses; and
   wherein the determining an analysis context based on the text, the linguistic entities, and the associated linguistic entity categories comprises:
      determining an analysis context for a first one of the plurality of clauses, the analysis context for the first one of the plurality of clauses including the subject type category, the analysis type category and the dimension type category, wherein the subject type category included in the analysis context for the first one of the plurality of clauses specifies a subject of an analysis, said subject of the analysis being a numerical indicator of value, wherein the analysis type category included in the analysis context for the first one of the plurality of clauses is different than the subject type category and represents an intent of the analysis, wherein the dimension type category included in the analysis context for the first one of the plurality of clauses is different than both the subject type category and the analysis type category and represents an axis of the analysis, wherein values of a quantity are to be disposed along the axis of the analysis.

10. The method according to claim 9, further comprising:
determining an analysis context that is for a second one of the plurality of clauses and separate from the analysis context for the first one of the plurality of clauses, wherein the second one of the plurality of clauses immediately precedes the first one of the plurality of clauses in the received text; and
determining an analysis context that is for a third one of the plurality of clauses and separate from both the analysis context for the first one of the plurality of clauses and the analysis context for the second one of the plurality of clauses, wherein the third one of the plurality of clauses immediately follows the first one of the plurality of clauses in the received text.

11. The method according to claim 10, wherein the first one of the plurality of clauses, the second one of the plurality of clauses and the third one of the plurality of clauses are each a single sentence.

12. The method according to claim 1, wherein the receiving structured data in response to the query of the semantic layer comprises:
receiving structured data from an OLAP data source.

13. The method according to claim 1, wherein the determining, by the system, whether the one or more semantic objects are to be filtered comprises:
if an analysis type category for the analysis context is a first predefined category, not filtering data for values of a semantic object that is explicitly mentioned in a same clause as the analysis type category.

14. A non-transitory computer-readable medium having stored thereon program code, the program code executable by a computer to perform a process comprising:
receiving text;
extracting a plurality of linguistic entities and associated linguistic entity categories based on the text;
determining one or more semantic objects of a semantic layer based on the linguistic entity categories, wherein each of the one or more semantic objects of the semantic layer associates one or more physical entities stored in a data source with user-friendly names;
determining an analysis context based on the text, the linguistic entities, and the associated linguistic entity categories;
after determination of the analysis context and the one or more semantic objects, generating a query of the semantic layer based on the analysis context and the one or more semantic objects, wherein the generating the query of the semantic layer comprises:
determining, based on the linguistic entity categories that were extracted, whether the one or more semantic objects are to be filtered, and in response to determining to filter the one or more semantic objects, determining how to filter the semantic objects,
wherein when a value from a first linguistic entity category matches a value for one of the one or more semantic objects, using the value from the first linguistic entity category as a query filter, and when only a single entity is mentioned for the first linguistic entity category, including the entity in the query filter and removing the first linguistic entity category from a result of the query of the semantic layer; and
receiving a structured data result in response to the query of the semantic layer.

15. The medium according to claim 14, wherein the extracting the plurality of linguistic entities comprises:
identifying the plurality of linguistic entities from a plurality of semantic object-independent linguistic entity categories and a plurality of semantic object-dependent linguistic entity categories,
wherein the plurality of semantic object-dependent linguistic entity categories are associated with the semantic layer, and
wherein each of the plurality of semantic object-dependent linguistic entity categories is associated with a respective semantic object of the semantic layer and each particular entity of each particular semantic object-dependent linguistic entity category is associated with a value of the respective semantic object associated with the particular semantic object-dependent linguistic entity category.

16. The medium according to claim 14, the process further comprising:
identifying two or more phrases from the text,
wherein determination of an analysis context comprises:
for each of the two or more phrases, identification of an associated linguistic entity.

17. The medium according to claim 16, wherein the extracting the associated linguistic entity comprises:
identifying the associated linguistic entity category from a plurality of semantic object independent linguistic entity categories and a plurality of semantic object-dependent linguistic entity categories,
wherein the plurality of semantic object-dependent linguistic entity categories are associated with the semantic layer, and
wherein each of the plurality of semantic object-dependent linguistic entity categories is associated with a respective semantic object of the semantic layer and each particular entity of each particular semantic object-dependent linguistic entity category is associated with a value of the respective semantic object associated with the particular semantic object-dependent linguistic entity category.

18. The medium according to claim 14, wherein the generating the query of the semantic layer comprises:
generating a second query based on the analysis context.

19. The medium according to claim 14, the process further comprising:
receiving query results associated with the query; and
determining a visualization based on the query results and on one or more of the associated linguistic entity categories.

20. The medium according to claim 19, the process further comprising:
determining the visualization based on an Analysis Type category associated with the query.

21. A system comprising:
a semantic layer including a plurality of semantic objects;
a computer comprising:
a linguistic processor to:
receive text; and extract a plurality of linguistic entities and associated linguistic entity categories based on the text; and a query builder to:

determine one or more semantic objects of the semantic layer based on the linguistic entity categories, wherein each of the one or more semantic objects of the semantic layer associates one or more physical entities stored in a data source with user-friendly names;

determine an analysis context based on the text, the linguistic entities, and the associated linguistic entity categories;

after determination of the analysis context and the one or more semantic objects, generate a query of the semantic layer based on the analysis context and the one or more semantic objects, wherein the generate a query of the semantic layer based on the analysis context and the one or more semantic objects comprises:

determine, based on the linguistic entity categories that were extracted, whether the one or more semantic objects are to be filtered, and in response to determining to filter the one or more semantic objects, determining how to filter the semantic objects, wherein when a value from a first linguistic entity category matches a value for one of the one or more semantic objects, using the value from the first linguistic entity category as a query filter, and when only a single entity is mentioned for the first linguistic entity category, including the entity in the query filter and removing the first linguistic entity category from a result of the query of the semantic layer; and receive a structured data result in response to the query of the semantic layer.

22. The system according to claim 21, the linguistic processor to extract the plurality of linguistic entities by identifying the plurality of linguistic entities from a plurality of semantic object-independent linguistic entity categories and a plurality of semantic object-dependent linguistic entity categories, wherein the plurality of semantic object-dependent linguistic entity categories are associated with the semantic layer, and wherein each of the plurality of semantic object-dependent linguistic entity categories is associated with a respective semantic object of the semantic layer and each particular entity of each particular semantic object-dependent linguistic entity category is associated with a value of the respective semantic object associated with the particular semantic object-dependent linguistic entity category.

23. The system according to claim 21, further comprising: a visualization engine to:

receive query results associated with the query; and determine a visualization based on the query results and on one or more of the associated linguistic entity categories.

24. The system according to claim 23, the visualization engine further to determine the visualization based on an Analysis Type category associated with the query.

25. A method comprising:

receiving text;

extracting a plurality of linguistic entities and associated linguistic entity categories based on the text;

determining one or more semantic objects of a semantic layer based on the linguistic entity categories;

dividing the received text into a plurality of clauses;

determining an analysis context for a first one of the plurality of clauses based on the text, the linguistic entities, and the associated linguistic entity categories;

generating a query of the semantic layer based on the analysis context and the one or more semantic objects, wherein the generating the query of the semantic layer comprises determining, by the system, based on the linguistic entity categories that were extracted, whether the one or more semantic objects are to be filtered, and in response to determining to filter the one or more semantic objects, determining how to filter the semantic objects, wherein when a value from a first linguistic entity category matches a value for one of the one or more semantic objects, using the value from the first linguistic entity category as a query filter, and when only a single entity is mentioned for the first linguistic entity category, including the entity in the query filter and removing the first linguistic entity category from a result of the query of the semantic layer, and receiving a structured data result in response to the query of the semantic layer; and receiving a row-set in response to the query of the semantic layer;

wherein the linguistic entity categories include a subject type category, an analysis type category and a dimension type category;

wherein the determining an analysis context based on the text, the linguistic entities, and the associated linguistic entity categories comprises:

determining an analysis context for a first one of the plurality of clauses, the analysis context for the first one of the plurality of clauses including the subject type category, the analysis type category and the dimension type category, wherein the subject type category included in the analysis context for the first one of the plurality of clauses specifies a subject of an analysis, said subject of the analysis being a numerical indicator of value, wherein the analysis type category included in the analysis context for the first one of the plurality of clauses is different than the subject type category and represents an intent of the analysis, wherein the dimension type category included in the analysis context for the first one of the plurality of clauses is different than both the subject type category and the analysis type category and represents an axis of the analysis, wherein values of a quantity are to be disposed along the axis of the analysis;

wherein the analysis type category included in the analysis context for the first one of the plurality of clauses has a name; and wherein the method further comprises:

using the name of the analysis type category in the analysis context for the first one of the plurality of clauses as a parameter for a rule-based determination of a type of chart most suited to present the row-set that is received in response to the query that is generated based on the analysis context that includes the analysis type category.

26. The method according to claim 25, wherein the generating the query of the semantic layer based on the analysis context and the one or more semantic objects comprises:

generating the query of the semantic layer based on the analysis context for the first one of the plurality of clauses and the one or more semantic objects without considering the analysis type category included in the analysis context for the first one of the plurality of clauses.

27. The method according to claim 25, wherein each of the one or more semantic objects of the semantic layer associates one or more physical entities stored in a data source with user-friendly names.

28. A method comprising:
receiving text in a system that includes a processor;
generating, by the system, a query of a semantic layer in response to the receiving the text; and
receiving, by the system, structured data in response to the query of the semantic layer;
wherein the generating, by the system, a query of the semantic layer comprises:
after receiving the text, extracting, by the system, a plurality of linguistic entities and associated linguistic entity categories based on the text;
determining, by the system, one or more semantic objects of the semantic layer based on the linguistic entity categories;
determining, by the system, an analysis context based on the text, the linguistic entities, and the associated linguistic entity categories; and after determination of the analysis context and the one or more semantic objects by the system, generating, by the system, the query of the semantic layer based on the analysis context determined by the system and the one or more semantic objects determined by the system, wherein the generating the query of the semantic layer comprises:
determining, by the system, based on the linguistic entity categories that were extracted, whether the one or more semantic objects are to be filtered, and in response to determining to filter the one or more semantic objects, determining how to filter the semantic objects,
wherein when a value from a first linguistic entity category matches a value for one of the one or more semantic objects, using the value from the first linguistic entity category as a query filter, and when only a single entity is mentioned for the first linguistic entity category, including the entity in the query filter and removing the first linguistic entity category from a result of the query of the semantic layer; and
receiving a structured data result in response to the query of the semantic layer.

29. The method according to claim 28, wherein each of the one or more semantic objects of the semantic layer associates one or more physical entities stored in a data source with user-friendly names.

* * * * *